Figure 1:
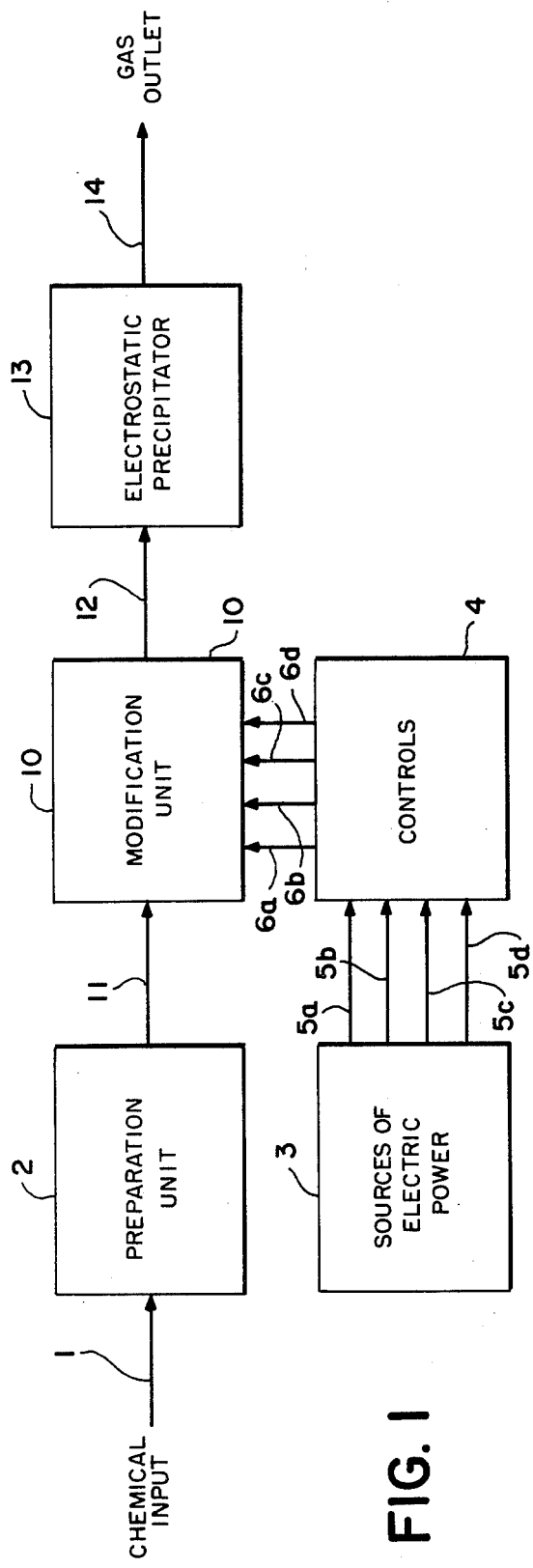

United States Patent [19]

Rhoades et al.

[11] 4,077,889

[45] Mar. 7, 1978

[54] ARC DISCHARGE APPARATUS

[76] Inventors: John Stewart Rhoades, P.O. Box 197, Exton, Pa. 19341; Gary Kulp, Blackberry La., R.D. 1, Box 185, Malvern, Pa. 19355

[21] Appl. No.: 667,880

[22] Filed: Mar. 17, 1976

Related U.S. Application Data

[63] Continuation-in-part of Ser. No. 638,707, Dec. 8, 1975.

[51] Int. Cl.$^2$ ............................................. B01K 1/00
[52] U.S. Cl. ................................. 250/543; 204/164; 204/165; 250/542; 250/547
[58] Field of Search ............... 250/531, 532, 542–547; 204/164, 165, 170

[56] References Cited

U.S. PATENT DOCUMENTS

| | | | |
|---|---|---|---|
| 3,526,583 | 9/1970 | Hayward | 204/165 |
| 3,562,127 | 2/1971 | Wooton et al. | 204/164 |
| 3,745,751 | 7/1973 | Zey et al. | 250/532 X |
| 3,755,120 | 8/1973 | Kinser | 204/164 |
| 3,846,637 | 11/1974 | Gettinger | 250/546 |
| 3,883,413 | 5/1975 | Douglas-Hamilton | 204/176 |
| 3,959,661 | 5/1976 | Sander | 250/531 |

FOREIGN PATENT DOCUMENTS

| | | | |
|---|---|---|---|
| 1,140,424 | 7/1957 | France | 250/542 |

*Primary Examiner*—F.C. Edmundson
*Attorney, Agent, or Firm*—Weiser, Stapler & Spivak

[57] ABSTRACT

A flexible technique for modifying various chemical substances utilizes a confined path to be followed by these substances in gaseous form or in a gaseous medium. Along this path there is positioned electrically energizeable means for establishing an electric field. Also along the path there are positioned electrically energizeable means for heating the gas to crack certain constituents into free elements; for combusting certain constituents; and for attracting certain constituents through affinity. The electrical energization of these means is controllable to provide the appropriate effect on the substances in the path.

10 Claims, 2 Drawing Figures

ARC DISCHARGE APPARATUS

This application is a continuation-in-part of application Ser. No. 638,707 filed Dec. 8, 1975 and entitled Emission Control Technique.

This invention relates to improvements in the chemical treatment of substances. In present day technology such treatment, and particularly the modification of the chemical constitution of substances, is assuming ever increasing importance. Many of the so-called miracles of modern technology are based on such modifications. Innumerable examples of this could be given. These range from such simple modifications as changing carbon monoxide to carbon dioxide by the addition of an oxygen atom, all the way to the modification of complex hydrocarbons in such a manner as to produce different compounds with significantly altered physical and/or chemical properties. Also, separation of compounds into certain constituents is often desirable as, for example, the dissociation of hydrogen from compounds in which it is originally bound in order to make the hydrogen available for subsequent utilization, e.g. as a source of energy.

The techniques used to achieve such modifications have, heretofore, tended to be highly specialized. Each particular modification tended to be performed by a specific technique and implementing equipment, specifically designed and constructed essentially exclusively for the purpose of accomplishing that modification. While there are circumstances under which such specialization is appropriate, there are others in which it would be preferable to provide a multi-purpose technique capable of accomplishing a variety of possible such modifications with essentially the same implementing equipment. To the extent that changes in the equipment would still be required for different specific applications, these changes would be easily carried out, primarily by the adjustment of electrical controls, rather than by changes in the mechanical portions of the equipment.

Accordingly, it is a primary object of the invention to provide a technique for carrying out modifications in chemical substances.

It is another object to provide such a technique which is capable of accomplishing a variety of such modifications.

It is another object to provide such a technique which can be carried out by equipment which does not require major mechanical changes for different applications.

It is still another object to provide such a technique in which the equipment adjustments for different applications are primarily electrical.

These and other objects which will appear are achieved in accordance with the invention by causing the substances to be modified, in volatile form, to traverse a chamber in which they are susceptible to being subjected, selectively, to a sequence of operations which include cracking, combusting, an electric field and attraction through affinity.

Figure 2:
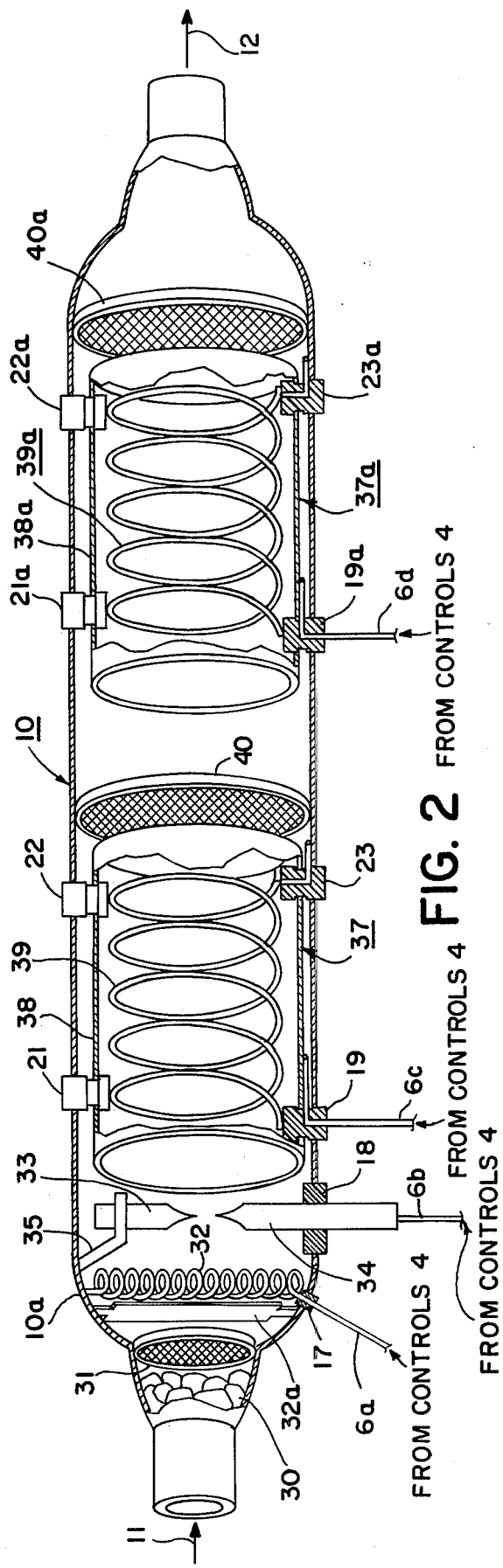

For further details reference is made to the discussion which follows, in light of the accompanying drawings wherein FIG. 1 is a diagrammatic representation of the overall system embodying the present invention;

FIG. 2 is a view, partly cut away, showing certain details of construction of one of the elements of the system of FIG. 1.

The same reference numerals are used in the different figures to designate corresponding elements.

Referring now to these drawings, and particularly to FIG. 1, the chemical substance or substances to be treated in accordance with the invention are introduced into the system at 1. This indicates schematically the input to a preparation unit 2. The output of the preparation unit is supplied by a suitable connection 11 to the modification unit 10 in which the actual modification or modifications of the chemical substances in accordance with the invention takes place. The materials resulting from treatment in this modification unit 10 are evacuated at 12. An electrostatic precipitator unit 13 may be connected to the output 12 from modification unit 11. The unprecipitated components then issue at 14 in FIG. 1.

Electric power sources collectively designated by the reference numeral 3 in FIG. 1 are provided for modification unit 10. Their respective outputs pass through controls collectively designated by the reference numeral 4 in FIG. 1 and the outputs of these controls, in turn, are supplied to the modification unit 10.

For reasons which will appear later, there are four different outputs 5a through 5d shown from electric power sources 3 leading to controls 4 and four corresponding outputs 6a through 6d from controls 4 to modification unit 10.

As more fully described hereafter, the modification unit 10 is constructed to process the chemical substances which are to be modified while these are either themselves in the form of a gas or while they are dispersed in a gaseous medium in such a manner as to be entrained by that medium.

The introduction of this gas or gaseous medium (in the latter case entraining the substances to be modified) takes place through connection 11 in FIG. 1. The corresponding removal of the gas or gaseous medium then is what is denoted by gas outlet 12 in FIG. 1.

The preparation unit 2 serves to place the substances to be processed into the gaseous form in question if it is not already in gaseous form or at least to disperse these substances in a gaseous medium if necessary.

This preparation unit may take any of a number of conventional forms for that purpose.

If the substance to be treated in modification unit 10 is already a gas then it may be simply be in the form of an inlet conduit leading to the modification unit 10 itself. If the substance to be treated is not in the form of a gas, then the preparation unit 2 may, for example, be in the form of equipment which gasifies that substance. This may take various forms including, for example, evaporating equipment if that is appropriate.

Alternatively, for substances which do not lend themselves conveniently to be actually turned into a gas for treatment, the substance may be finely subdivided, as for example by grinding or pulverizing, and then be entrained in a gaseous transporting medium, such as compressed air, or if appropriate and necessary, an inert gas.

In any of the foregoing cases, the resultant gas or gaseous transport medium is supplied through an appropriate inlet duct to modification unit 11.

As explained more fully hereafter, the modification unit 10 functions under electrical energization of several of its constituents. It is the electrical power which is necessary for such energization which is supplied by power sources 3. As will appear more fully hereafter, these sources may take any of a variety of conventional forms known as suitable sources for the various voltages and current requirements of modification unit 10. Different ones of these values of voltage and current are provided at the different output connections 5a through 5d of electric power sources 3. The controls 4 then operate to suitably modify the electrical outputs so provided by power sources 3 before these are supplied to modification unit 10. In the specific embodiment described in detail herein, such modification will consist, in practice, of simply connecting or disconnecting the particular electric power source from the modification unit. Thus controls 4 may consist essentially of off-on switches interposed between output connections 5a through 5d of power sources 3 and the corresponding connections 6a through 6d leading from controls 4 to modification unit 10.

Turning now to FIG. 2, this shows in detail the construction of modification unit 10.

Unit 10 comprises a generally cylindrical housing 10a which, in its general outward appearance, may be similar to a conventional automobile muffler. Thus, it includes a central portion of predetermined diameter and end portions of smaller diameter to which the central portion gradually tapers.

The direction of intended flow through unit 10 of gaseous substance, or gaseous transport medium with entrained substance, is from left to right in FIG. 2, the arrows 11 and 12 indicating the inlet and outlet, repsectively. The connections of unit 10 into the system of FIG. 1 may be made in any conventional manner, as by suitable clamps or pressure fittings (not shown). Four electrical cable connections 6a through 6d to unit 10 are shown in FIG. 1. Each of these comes from the controls 4 of FIG. 1. Each leads to an insulating fitting, or coupling on the outside wall of the unit 10. These respective fittings are designated by reference numerals 17, 18, 19 and 19a in FIG. 2. As further explained below, each of these fittings 17 through 19a serves to provide a path into the interior of the unit 10 for its respective electrical connection 6a through 6d. These fittings are such as to insulate the connection from the shell of unit 10, so that the electricity supplied by the respective connection is not short-circuited to that shell while being conducted into the interior of unit 10 for purposes discussed below. The fittings must also be capable of withstanding the heat in unit 10.

There are also two sets of three additional insulating fittings provided on unit 10. One set is designated by reference numerals 21, 22 and 23, the other by reference numerals 21a, 22a, and 23a. These do not serve to conduct electricity into its interior. Rather, two of these fittings in each set of three serve only to support certain internal structure insulated from the shell of unit 10. The third fitting in each set of three also serves an insulating support function, but further serves as a ground connection to the outer shell.

Inside the leftmost portion of unit 10, which is the direction from which gas is introduced, a quantity of copper wool 30 is positioned, retained against penetrating further into the interior of unit 10 by a screen 31. Beyond screen 31 in the direction of the interior of unit 10 there is placed a coil 32 which is preferably made of a suitable electrical resistance heating material, such as nickel-chromium wire. One end of the coil 32 is connected to electrical cable 6a entering the unit 10 through coupling 17. The other end of the coil 32 is connected to the housing itself, which serves as the electrical ground. Between screen 31 and coil 32, upstream from the latter, there is a baffle 32a protecting coil 32 from direct exhaust impingement.

Further towards the interior of unit 10 with respect to coil 32, there is positioned a pair of electrodes 33, 34. These electrodes are preferably positioned diametrically opposite each other in the interior of unit 10. They preferably have sharply pointed or edged terminal portions confronting each other. Electrode 34 is connected to electrical conductor 6b reaching the interior of unit 10 through coupling 18. Electrode 33, on the other hand, is supported by a metal standoff support 35 directly from the outer shell of unit 10 and is thereby grounded electrically to that shell.

Further toward the interior of unit 10 with respect to electrodes 33 and 34 there is a structure 37 comprising an outer cylindrical shell 38 fitted within but spaced from the cylindrical housing 10, and a spiral-form coil 39 spiralling lengthwise within a cylinder 38. Both coil 39 and cylinder 38 are made of copper. One end of coil 39 is grounded to the outer shell of unit 10 through insulating element 23. The other end of conductive coil 39 terminates at insulating element 19, by means of which it is kept electrically insulated from the outer shell of unit 10.

Cylindrical shell 38 is maintained at a positive potential with respect to the coil 39 by means of electric potential supplied via cable 6c through coupling 19. Shell 38 is maintained insulated from both coil 39 and from the outer shell of unit 10 by being attached partway up on the internally protruding portions of insulators 19, 21, 22 and 23. Preferably cylinder 38 is externally coated with a refractory material, such as ceramic or enamel to improve its insulation from the outer shell and also prevent deterioration.

Next to unit 37 in the downstream direction of exhaust flow there is preferably positioned a circular screen 40 of comparatively wide-mesh material.

Beyond screen 40, in the downstream direction, there is positioned an assembly 37a, which may be similar to unit 37; except that its two major constitutents (coil 39a and shell 38a) are made of molybdenum rather than copper.

Coil 39a is again grounded to the outer shell of unit 10, and cylinder 38a supplied with positive potential via cable 6d and coupling 19a.

Downstream from assembly 37a there may be a circular screen 40a of wide-mesh material.

In accordance with the present invention, gas enters unit 10 along the direction indicated by arrow 11 in FIG. 2.

This gas initially traverses the copper wool 30 filling the inlet to unit 10. This copper wool serves primarily to prevent overheating of the internal elements of unit 10 by the entering material, in the event that this should be hot from prior processing activities.

After passing through the copper wool and the retaining screen 31 for the copper wool, the gas traverses the portion of unit 10 containing coil 32. This coil is energized through cable 6a with adequate voltage and power for raising the temperature of resistance heating coil 32 to the desired value. The purpose of this coil 32, heated as described above, is to decompose or "crack" certain of the constitutents which may be present in the gas. In particular, carbon, hydrogen and oxygen, if present in various composite forms in the gas, is liberated in free form not bound into compounds with other substances.

Following this decomposition or "cracking", the gas continues into the region of unit 10 defined by electrodes 33, 34. These electrodes are energized to provide a sufficient potential difference between them so that a substantially continuous electric arc will form between their confronting points. Suitable values are in the range of 18 to 30 kilovolts. The electricity needed for this is supplied through cable 6b to electrode 34. Electrode 35, on the other hand, is grounded to the outer casing of unit 10 through mounting bracket 35.

The arc so formed between electrodes 33 and 34 serves to burn hydrocarbons which remain unburned in the substances traversing unit 10. It also serves to further oxidize any carbon monoxide present in these substances to carbon dioxide.

The gas then continues from the region defined by electrodes 33 and 34 into the region defined by assembly 37, traversing that assembly and particularly cylinder 38. The cylinder 38 is brought to a suitable electrical potential. The necessary potential is supplied through cable 6c. Since the coil 39 within assembly 37 is at ground potential relative to cylinder 38, an electrostatic field extending essentially radially outward within cylinder 38 is established. This field serves to produce dissociation of oxygen and hydrogen from compounds of these elements which may be present in the material passing through cylinder 38.

The gas then flows through metal screen 40, which is at ground potential by virtue of being in electrical contact through its annular rim with the inner surface of the shell of unit 10. This screen 40 provides cathodic protection for the electrically active elements which precede it.

The gas next passes through assembly 37a, particularly cylinder 38a. Here there takes place further dissociation of oxygen and hydrogen. Because the metal of coil 39a and cylinder 38a is molybdenum, any sulfur compounds from which such oxygen and hydrogen are dissociated, will tend to be intercepted by that molybdenum, due to its affinity for sulphur. Thus $H_2S$ and $SO_2$ compounds will dissociate into hydrogen, oxygen, and sulphur, the sulphur being affected as discussed above.

The cylinder 38a is brought to a suitable electrical potential, as necessary for the intended use, by electricity supplied through cable 6d.

Again screen 40a provides cathodic protection for assembly 37a.

For both protective screens 40 and 40a, the material providing cathodic protection is chosen to be higher on the electromotive scale than the assembly being protected. For assembly 37, of copper, cadmium would be suitable for protector 40. For assembly 37a tungsten would be suitable for protector 40a. The latter may even be omitted, if desired, due to the inherent toughness of the molybdenum.

In order to promote the affinity effect in assembly 37a, the molybdenum in this assembly is preferably maintained in a state in which its surface is somewhat bubbly. This is achieved by maintaining the molybdenum at the appropriate temperature. This is to be distinguished from red heat, which should not be achieved by the molybdenum in assembly 37a. The desired temperature will prevail inherently by the heat of the material flowing through unit 10 at this stage, or may be further elevated, if necessary, by using the cylinder 38a to provide resistance heating. In that case, a suitable electric heating coil may be wrapped around the outside of cylinder 38a, between it and the shell of unit 10. The preferred temperature is white heat at approximately 2000° F.

In both assemblies 37 and 37a, the dissociated elements tend to move toward the coil or the cylinder depending on their respective electrical characteristics.

After passage through the remainder of unit 10, the remaining constitutents of the material are removed from unit 10 in the direction indicated by arrow 12.

In the description of FIG. 2 presented below, it has been assumed that the substances to be modified by passage through modification unit 10 are already in the form suitable for that purpose. Preparation unit 2 (FIG. 1) brings this about, as necessary.

For example, if the substance to be modified is a liquid, preparation unit 2 may be in the form of an evaporator, which transforms that liquid into gas. This is done in any appropriate conventional manner, preferably also involving an elevation of temperature, rendering the substance more suitable for processing by modification unit 10.

Other preparations will be performed for other types of starting substances. For example, a solid substance may be pulverized, and then entrained in finely powdered form in a stream of inert gas.

The specific electrical voltages and currents supplied via outputs 5a through 5d to controls 4 and thence to modification unit 10 are chosen to conform to the specific requirements of the substances passing through unit 10. It is well within the skill of the art to produce any such voltages and currents, conventional sources thereof being well known in electrical technology. Generally speaking output 5a will provide a comparatively high-current output, consistently with the function of coil 32 in performing resistance heating. Output 5b will provide a comparatively high voltage for electric arc formation between electrodes 33, 34. Outputs 5c and 5d will provide comparatively low voltages, consistent with the production of a field which causes electrolysis using the gaseous medium as electrolyte.

If it is desired to recover the solid particulate constituents of the materials issuing from modification unit 10, separately from the gaseous constitutents, a conventional electrostatic precipitator unit 13 may be connected at 12 (FIGS. 1 and 2). Such an electrostatic precipitator unit may take any one of numerous conventional forms and is therefore not described in further detail herein.

It will be understood that the controls 4 are not necessarily in the form of simple on-off switches which either enable or disable the application of electric power to the respective elements of modification unit 10. Rather, these controls may be adjustable to supply such power with varying values of voltage and/or current, as appropriate for the particular substances to be modified in unit 10. Such adjustable controls may take the form of rheostats, or of other variable voltage and current controls, all as entirely conventional in electrical technology.

Also, the specific sequence of constituent functions within unit 10 need not always be exactly as described above and shown in FIG. 2.

For example, the location of assemblies 37 and 37a may be interchanged so that the substances traverse first assembly 37a and then assembly 37.

It will be understood that various other embodiments and modifications will occur to those skilled in the art without departing from the inventive concept.

By way of example, a substance known as terpinol, chemical formula $C_{10}H_{18}(OH)$ can be modified to be a substance known as pinene, chemical formula $C_{10}H_{16}$, by passage through modification unit 10, with the controls 4 appropriately set. To place the starting substance terpinol into its proper gaseous form, it is evaporated in preparation unit 2 by heating it to its boiling point, which is approximately 100° C in its hydrate form and approximately 200° C in its non-hydrate form. Pinene, in turn, is useful as an ingredient in industrial and perfume scents.

As another example, menthol, chemical formula $C_{10}H_{19}OH$ can be modified to be menthene, chemical formula $C_{10}H_{18}$, by passage through modification unit 10 with controls 4 appropriately set. Menthol has a boiling point of approximately 103°–104° C and is evaporated at that temperature in preparation unit 2. Menthene, being lighter than water, can be considered as a movement propellant. It also has applications as a starting material for scents, particularly after further modifying it to be encalyptole, chemical formula $C_{10}H_{18}O$.

We claim:

1. A system for modifying chemical substances, comprising:
    a confined path for said substances;
    means for preparing said substances for introduction into said path, said preparing means including means for gasifying the substances or finely dividing them and entraining them in a gaseous medium;
    means for introducing the prepared substances into the path;
    electrically energizeable means for establishing in a predetermined portion of the path an electric field;
    a metal having an affinity for at least one said substance, the affinity metal being positioned in the same portion of the path as the field establishing means;
    electrically energizeable means for establishing an electric arc across another portion of the confined path; and
    electrically energizeable means positioned in still another part of the path for heating the substances passing therethrough to produce cracking of at least some of the substances into free elements,
    the arc means and cracking means being both positioned in the path upstream from the electric field means.

2. The system of claim 1, comprising means for adjustably controlling the electrical energization of the arc establishing means.

3. The system of claim 2, wherein the controlling means comprises means for selectively connecting and disconnecting the electrical energization.

4. The system of claim 1 comprising a second electrically energizeable means for establishing an electric field in another part of the path, and an affinity metal for another said substance positioned in said other path part.

5. The system of claim 4 comprising means for adjustably controlling the energization of the second field establishing means.

6. The system of claim 5, wherein the control means includes means for selectively connecting and disconnecting the electrical energization.

7. The system of claim 1 comprising means for adjustably controlling the electrical energization of the heating means.

8. The system of claim 7 wherein the control means includes means for selectively connecting and disconnecting the electrical energization.

9. The system of claim 1, wherein the gasifying means is heat-actuated evaporating means.

10. The system of claim 1 further comprising means for adjustably controlling the electrical energization of the field establishing means.

* * * * *